(12) United States Patent
Leard et al.

(10) Patent No.: US 12,629,885 B2
(45) Date of Patent: *May 19, 2026

(54) LARGE AREA ARRAYED LIGHT VALVES

(71) Applicant: Seurat Technologies, Inc., Wilmington, MA (US)

(72) Inventors: Francis L. Leard, Sudbury, MA (US); James A. DeMuth, Woburn, MA (US); Andrew J. Bayramian, Marblehead, MA (US); Drew W. Kissinger, Carlisle, MA (US); Joseph Gillespie, Boxford, MA (US)

(73) Assignee: Seurat Technologies, Inc., Wilmington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/347,339

(22) Filed: Jul. 5, 2023

(65) Prior Publication Data

US 2023/0356461 A1 Nov. 9, 2023

Related U.S. Application Data

(63) Continuation of application No. 17/513,462, filed on Oct. 28, 2021, now Pat. No. 11,738,505.

(Continued)

(51) Int. Cl.
B29C 64/153 (2017.01)
B22F 3/105 (2006.01)
(Continued)

(52) U.S. Cl.
CPC ............ B29C 64/153 (2017.08); B22F 3/105 (2013.01); B22F 12/30 (2021.01); B29C 64/268 (2017.08); B22F 10/20 (2021.01); B33Y 30/00 (2014.12)

(58) Field of Classification Search
CPC ..... B29C 64/153; B29C 64/268; B22F 3/105; B22F 12/30; B22F 10/20; B22F 12/41; B33Y 30/00; B33Y 10/00; G02F 1/133302; G02F 1/134309; G02F 1/1335; G02F 1/13439; G02F 1/135; Y02P 10/25
See application file for complete search history.

(56) References Cited

U.S. PATENT DOCUMENTS

| | | | |
|---|---|---|---|
| 4,734,558 A | 3/1988 | Nakano | |
| 4,826,300 A * | 5/1989 | Efron | G02F 1/1354 |
| | | | 438/479 |

(Continued)

FOREIGN PATENT DOCUMENTS

| | | |
|---|---|---|
| JP | S62242919 A | 10/1987 |
| JP | 01-094322 A | 4/1989 |

(Continued)

OTHER PUBLICATIONS

Diode-based additive manufacturing of metals using an optically-addressable light valve, Manyalibo J. Matthews, Optics Express 11788, vol. 25, No. 10, May 15, 2017.

*Primary Examiner* — Rebecca Janssen
(74) *Attorney, Agent, or Firm* — David R. Stevens; Stevens Law Group

(57) ABSTRACT

An additive manufacturing system includes at least two photoconductor plates attached to a substrate. Each photoconductor plate can include separate the Linear Electro layers and transparent conductive oxide layers.

18 Claims, 10 Drawing Sheets

Related U.S. Application Data

(60) Provisional application No. 63/107,260, filed on Oct. 29, 2020.

(51) Int. Cl.
B22F 12/30 (2021.01)
B29C 64/268 (2017.01)
B33Y 30/00 (2015.01)
B22F 10/20 (2021.01)

(56) References Cited

U.S. PATENT DOCUMENTS

| | | | |
|---|---|---|---|
| 4,884,875 A | 12/1989 | Okumura | |
| 5,124,545 A * | 6/1992 | Takanashi | G02F 1/0338 |
| | | | 250/214 LA |
| 5,168,378 A | 12/1992 | Black | |
| 5,471,331 A | 11/1995 | Takizawa | |

| | | | |
|---|---|---|---|
| 11,738,505 B2 * | 8/2023 | Leard | G02F 1/1335 |
| | | | 419/38 |
| 2006/0163998 A1 * | 7/2006 | Tiberi | H01J 29/89 |
| | | | 313/477 R |
| 2017/0232637 A1 * | 8/2017 | DeMuth | B22F 12/43 |
| | | | 264/497 |
| 2019/0202122 A1 * | 7/2019 | Vanelli | B22F 10/362 |
| 2020/0201161 A1 * | 6/2020 | Tian | H01S 5/0085 |
| 2020/0326606 A1 | 10/2020 | Ataei | |

FOREIGN PATENT DOCUMENTS

| | | |
|---|---|---|
| JP | 02-501095 A | 4/1990 |
| JP | H-04123019 | 4/1992 |
| JP | 05-216059 A | 8/1993 |
| JP | 1993257160 | 10/1993 |
| JP | H05265051 A | 10/1993 |
| WO | WO9107851 A1 | 5/1991 |
| WO | WO2019103567 A1 | 5/2019 |

* cited by examiner

Fig. 1A(ii)

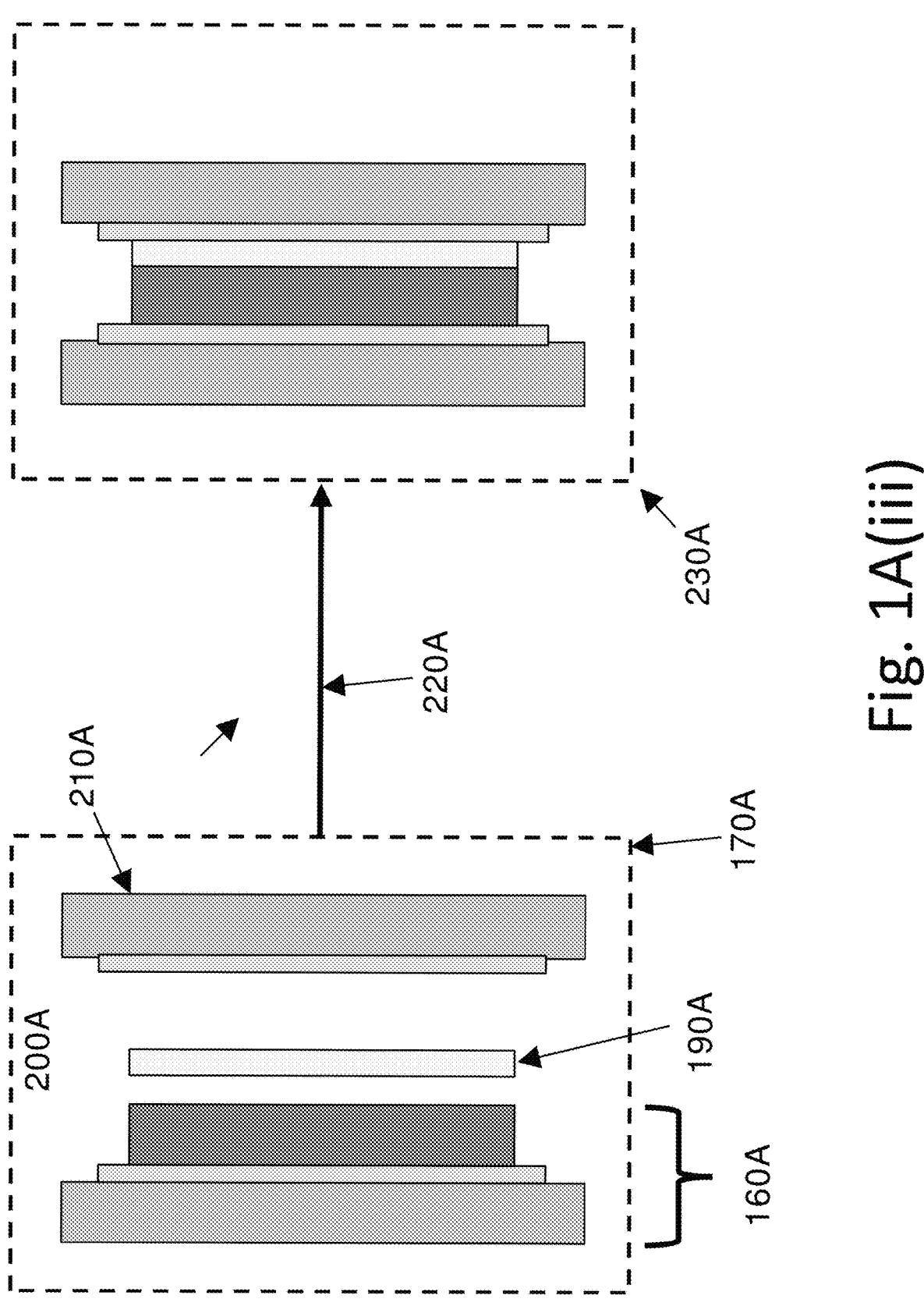
Fig. 1A(iii)

Fig. 1B(ii)

LARGE AREA ARRAYED LIGHT VALVES

RELATED APPLICATIONS

The present disclosure is a continuation of U.S. patent application Ser. No. 17/513,462, filed Oct. 28, 2021, which claims the benefit of U.S. Patent Application No. 63/107, 260, filed Oct. 29, 2020, both of which are incorporated by reference in their entirety.

TECHNICAL FIELD

The present disclosure generally relates to large area arrayed light valve systems. More particularly, use of arrayed photoconductors fixed to a substrate is described.

BACKGROUND

High power laser systems with light able to operate at high fluence for long durations are useful for additive manufacturing and other applications that can benefit from use of patterned high energy lasers. Unfortunately, light valves used in many conventional high energy/power systems are limited in size to by how large their photoconductors can be grown. For example, high quality Bismuth Silicate—$B_{12}SiO_{20}$ (BSO) crystal plates are typically size limited to 30 mm×30 mm since growing larger crystal boules to acquire larger plates results in lower yield due to impurities and defects. Consequently, light valves resulting from these plates have a limited clear aperture of ~30 mm×30 mm. This clear aperture limitation impacts the production rate of a metal additive manufacturing due to the energy fluence needs to be kept below damage threshold for a certain area of clear aperture. What is needed are techniques and structures that can provide large clear apertures by creating a large area light valve, while still using current cost effective crystal growth methods.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1A:
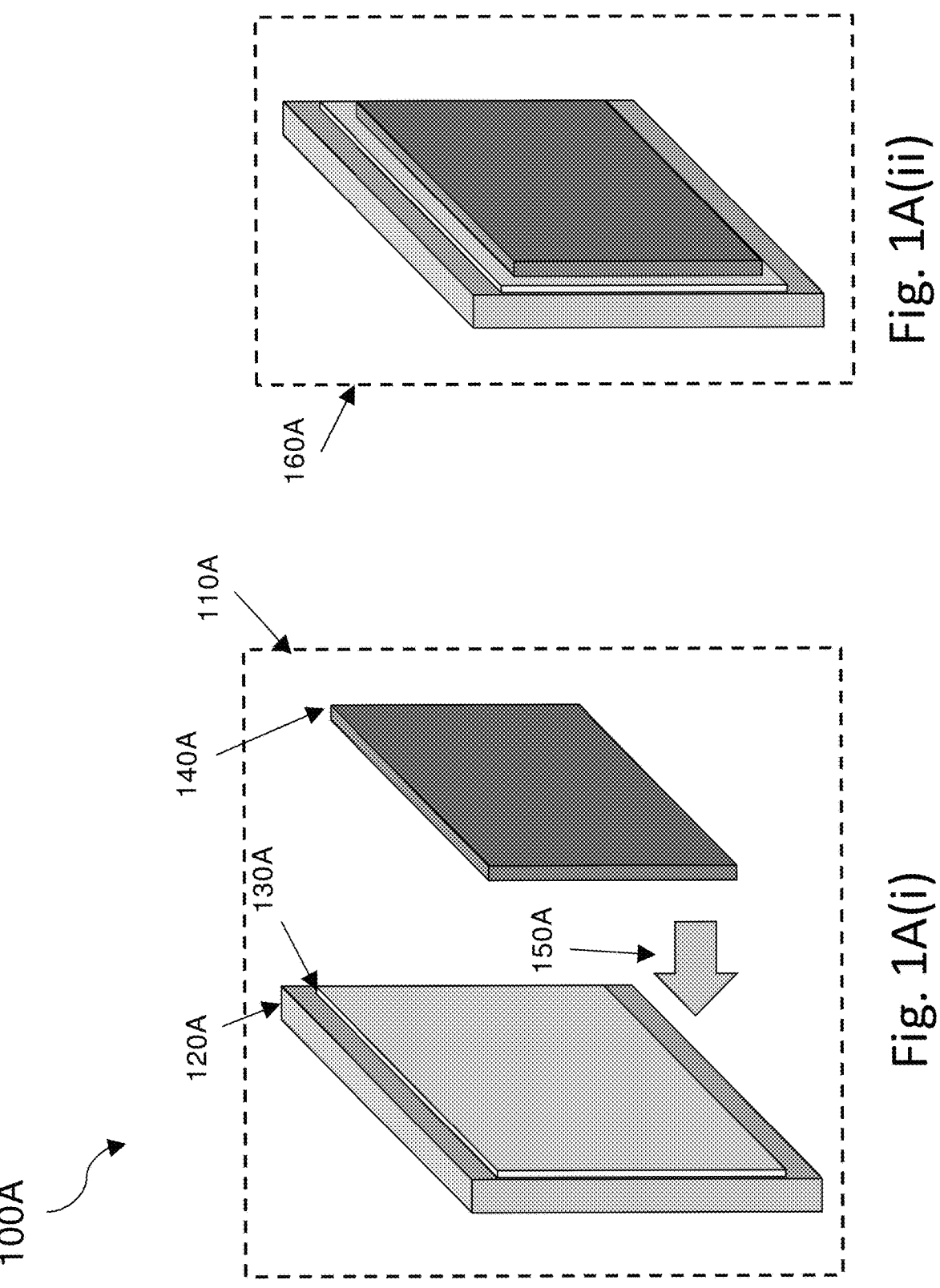
FIG. 1A(i-iii) illustrates a photoconductor composite (PC) for enhanced Light Valve (LV) operation FIG. 1B(i-ii) illustrates an embodiment of a photoconductor composite for large area LVs.

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

In the following disclosure, a light valve includes a photoconductor composite assembly composed of a photoconductor plate bonded to a stiff and flat supporting substrate.

The photoconductor plate is typically BSO but can be composed of other photoconductors.

The supporting substrate material (SSM) is typically C-cut sapphire or crystalline quartz and can be stiff enough to take on the coating The bonding material can be sodium silicate.

The SSM can take on many of the anti-reflective (AR) and transparent conductive oxide (TCO) coatings that normally reside on the PC and which tends to deform the PC. Lack of deformation during the coating process results easing the LV assembly and optimizing its performance.

Electrical connection can be achieved by creating a supporting substrate larger than the PC and extending the TCO layer beyond the full aperture of the PC such that it is outside high fluence laser (HFL) influence so to optimize available aperture of the PC and maintaining high LV laser damage threshold.

The PC softness allows it to be deformed and take on the good surface figure of the SSM during the compositing process.

In some embodiments a compositing process allows the PC to be polished without resulting in deformation In some embodiments a compositing process allows the PC external surfaces to be coated without resulting in deformation.

In some embodiments a compositing process allows the PC to be refurbished repeatedly.

In some embodiments a compositing process can be applied to an array of PCs atop a larger supporting substrate to enable a large area LV.

In some embodiments the array is post processed for flatness and coating.

In some embodiments an array process of composted PCs can be used to allow parallel PC composite manufacturing where PC composite assemblies are singulated from a large area PC composite.

In some embodiments an array process of composited PCs can be used to allow wafer scale manufacturing to be applied to LV construction in which the entire LV build process occurs in an automated format.

In one embodiment, the PCs are not polished en masse afterwards to achieve uniform flatness in which case individual secondary substrates are picked & placed and individual LV segments are constructed on the large area PC composite.

In some embodiments a process in (a) allows for either a ceramic electrical connection to be applied or a flex circuit in conjunction to be applied to reduce the assembly and LV costs.

In some embodiments a flexible LV structures allowed by use of flexible electrical backplanes to be used in astronomical or laser weapon system.

In some embodiments a flexible LV structures allow for replacement of traditional optical systems in which adaption (changing optical response such as zoom lensing or pattern reformatting) is required.

In some embodiments a compositing array method can be applied to construction of large area PCs from discrete and high yield blocks of PCs.

In some embodiments a large area singulated plates can be made by arrayed composite of smaller blocks before final surface finishing and plate singulation.

Large area light valves (LV) can be produced by arranging smaller affordable and higher yield photoconductor (PC) plates in an array atop a high damage threshold supporting substrate material (SSM) such as sapphire. The PC plates can be fixed using atomic or diffusion bonding, etchant-enhanced welding, glass frit epoxy bonding (frit is meant to include all forms of glass powder-based epoxies), dissolved glass bonding (also called glass glue) and even certain polymer based epoxy bonds.

Lateral arraying can be done with the PC being placed atop sapphire using glass glue. This arraying can be sometimes called sistering or compositing of the PC atop the SSM. The arraying can also take place before attachment to the SSM by taking bars of the PC harvested from its boule in a size that guarantees high process yield. The bars are attached using one of the fixation methods to its lateral surfaces and then sliced into plates as if it originated from a large boule. Sistering/compositing onto the SSM can then occur as if it was a single homogeneous plate.

The immediate advantage is the ability to manufacture a LV of large area without having to grow a boule to support that size plate. An additional benefit of contacting the PC plate to SSM by the same fixation method allows the PC plate to be made to conform to the flatness of the SSM—which can be controlled to a higher precision than that of the PC (difficult to grow material). The lateral arrayed PC arrangement atop the SSM can then be processed with enhanced surface figure which might not be possible with a single PC plate element without distortion. Such processing can include correcting for PC flatness, wedge and power aberrations. The ability to control and correct optical aberrations that are inherent in all LVs while allowing the LV to be arbitrary large is a significant additional benefit of arraying PCs by this method.

Advantageously, PC flatness enables the Linear Electro layer (LEO, usually liquid crystal) to be well controlled. The LEO layer thickness uniformity in turn determines the contrast uniformity (in amplitude or phase) across the LV's clear aperture which leads to maximum resolution and contrast control at the print plane.

Another embodiment provides for a composite of the PC atop the SSM, but with individual LV cells for each PC placed side by side using discrete secondary substrates. These secondary substrates can provide electrification to go from the interior to the exterior of the cell without compromising PC density/placement using plated through holes or around edge plating to allow for top side electrification. Since epoxy and conduction lines need to be protected from the high fluence system two ceramic 'window-frame' arrays can be placed on either side of the LV with input side being structured to be non-conductive while the output side contains protected electrification lines and compliant electrical connections to ensure electrification the individual LV circuitry.

An additional benefit in compositing individual PC plates to a larger SSM is to allow parallel photoconductor manufacturing by fixing components to a wafer and dicing systems from the wafer only after packaging. This method allows for automated processes to be used in LV construction, improving yield and reducing cycle and test time.

FIG. 1A(i-iii) illustrate a photoconductor composite (PC) 100A for enhanced Light Valve (LV) operation. Compositing (110A) starts out with a SSM (120A) which contains anti-reflective and transparent conductive oxide coatings (130A, AR and TCO, respectively) on the interior side. The SSM is one which can be made flat ($<\lambda/10$ at 632 nm) across 95% of its surface and is much stiffer than the PC that is being mated. This stiffness can be achieved by using materials naturally strong (i.e. Mohs>9) or by using thicker substrates or a combination of both. The SSM should have negligible absorption over the wavelength band of expected operation. An exemplary transmission band is 990 nm-1070 nm matching current diode and pulsed laser sources for additive manufacture. The SSM should also preferably be thermal expansion matched to the PC of choice. The importance of this lies in the many thermal processes required during the manufacturing process including the fixation process itself, polishing processes, coating processes, curing of the alignment layers and LEO layers during LV fabrication, and high power requirements of the LV in operation. Materials that are excellent candidates for the supporting substrate include C-cut sapphire, 7979 Fused Silica, silicon carbide, silicon nitride, diamond, calcium fluoride, crystalline quartz, ZnSe, or similar type of materials. A photoconductor (PC) is attached to 130A (arrow 150A) between 140A and 130A that can include atomic or diffusion bonding, etchant-enhanced welding, glass frit epoxy bonding (frit is meant to include all forms of glass powder-based epoxies), dissolved glass bonding (also called glass glue), polymer based epoxy bonds or similar fixation methods that would produce a negligible absorption, high strength bond, and able to withstand required laser fluences. FIG. 1A(ii) illustrates the resulting structure (160A) that forms a part of a PC composite assembly. As seen in FIG. 1A(iii) this assembly (160A) can then be used to construct a LV assembly (170A) that includes 160A along with Linear Electro-Optic and spacing assembly (190A) and a secondary substrate which contains a TCO and AR coating layer (200A) in a standard LV construction process (220A) to form an assembled composite LV (230A).

There are several benefits that is afforded by using a composite PC. In most cases the PC material can include a large number of materials including: Bismuth Silicates (BSO or $Bi_{12}SiO_{20}$, $Bi_6SiO_{10}$, $Bi_3SiO_5$, and similar variations), Bismuth Germanate (BGO or $Bi_{12}GeO_{20}$, $Bi_6GeO_{10}$, $Bi_3GeO_5$, and similar variations), Cadmium Selenide (CdSe) and similar type crystals. The photoconductor layer could also be composed of chalcogenide glasses such as $Ge_2Sb_2Te_5$ (GST), $Sc_{0.2}Sb_2Te_3$, GeTe, $Ag_4In_3Sb_{67}Te_{26}$, $Ge_{15}Sb_{85}$, or Sb. Additionally, it can be composed of polycrystalline materials such as CdTe, AZO, ZnSe, ZnS, or amorphous Si.

A common attribute of these materials is that they are fragile, soft, and lack the stiffness needed for ensuring flat reference surfaces off which a LEO layer can be constructed. By sistering or compositing a typical PC (BSO) to a much stiffer substrate, the lack of stiffness of typical PC becomes an advantage since bonding to the stiffer substrate will make it "follow" the SSM surface figure. Additionally, the supporting substrate can then be used to allow the exposed PC surface to be polished flat without risk of the part deforming after fabrication due to internal stresses.

Typically, the free-standing PC in a LV needs several types of AR and TCO coatings, all of which apply strain to the PC's surfaces resulting in its deformation. It is a common observation that a flat PC prior to coating becomes dramatically deformed or "potato chipped" after having these high strain coatings applied. A flat PC is required to ensure the LEO layer that it is mated to has a uniform thickness since this LV attribute ensures the highest contrast uniformity, best dynamic range, and fastest frame speed of the LV. In this composite case, almost all the high strain coatings can be applied to the supporting substrate before compositing the PC to it, eliminating the potential to have a warped PC with the added benefit of now having a stiff PC to which the interior coating can be applied without risk of PC deformation.

A further advantage of having the supporting substrate having the TCO layer on it instead of being on the PC is that the supporting substrate can be made larger than the PC extent thus any connection point can reside well outside full aperture of the PC. This enables even greater available aperture to be utilized for beam patterning. In existing LV assemblies, care must be taken to ensure the sensitive electrical connection and glue bonds are protected from flux of the HFL which can induce laser damage which significantly reduces the available aperture of the device.

An additional advantage of the composting method is the potential for reuse of the PC if it gets damaged during LV operation. It has been found that, even with moderate laser damage to the PC, it can be refurbished back to nearly pristine level by a follow-on process which will thin the part, but this process poses all of the same risks that the initial fabrication process has to a pristine PC plate. The composting method eliminate this risk by enabling refurbishment of the part supported on the SSM thereby allowing a damaged PC to be returned to service. If the initial PC was sized to be 1.1 mm thick to start, this refurbishment process allows for >10 refurbishing cycles before the PC is consumed to the point of non-utility.

Figure 1B:
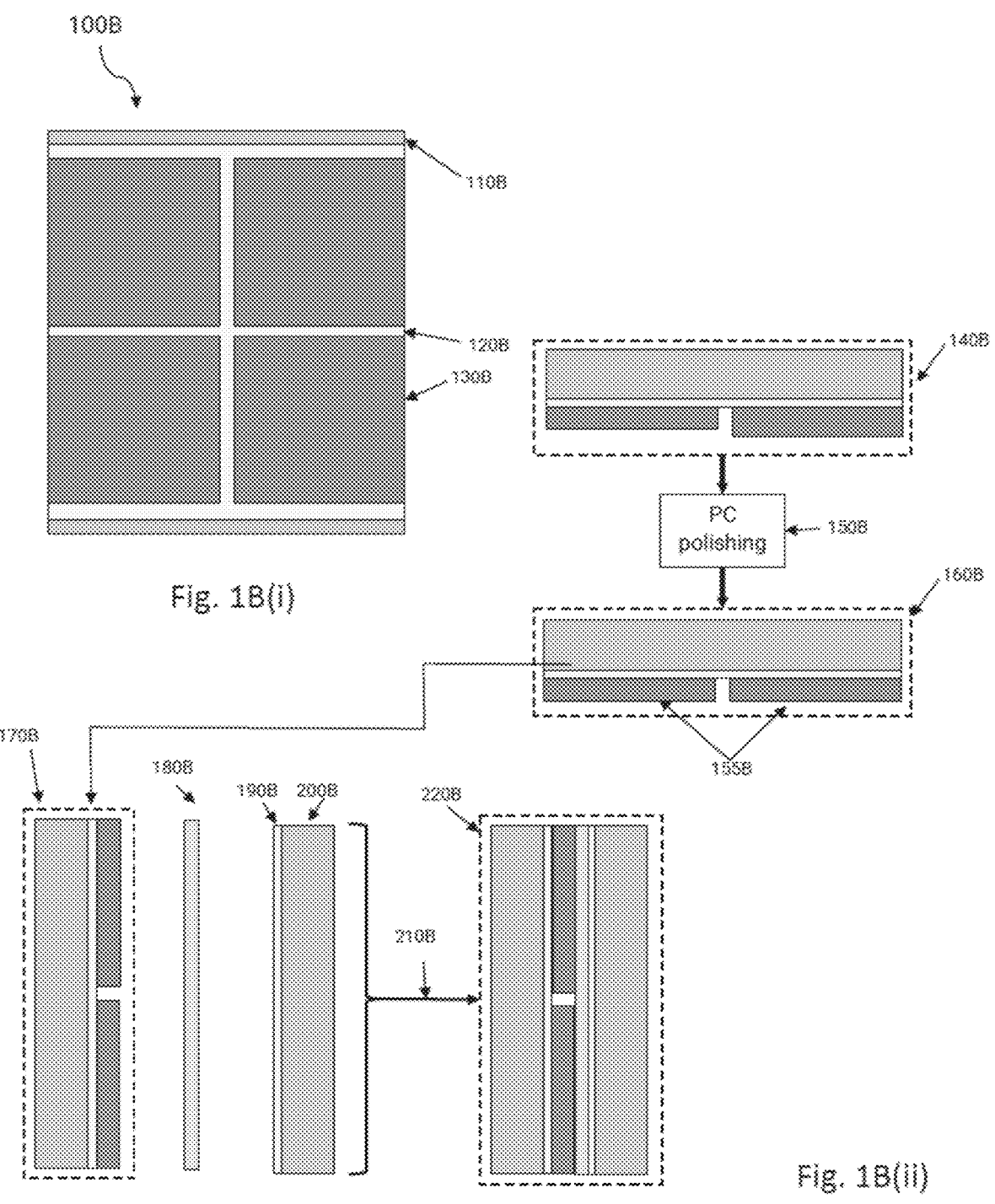
FIG. 1C illustrates singulation for parallel LV manufacturing.
FIG. 1D illustrates manufacture of arrayed LVs independent of PC thickness.
FIG. 1E illustrates arraying of photoconductor blocks to allow for generation of large area photoconductors plates.

FIG. 1B(i-ii) illustrates an embodiment of a photoconductor composite (PC) 100B for large area LVs. An array of composited PCs includes an appropriately sized supporting substrate (110B) that affords an area needed to accept the number of PCs that will be composited on it, In the example illustrated with respect to FIG. 1B(i) a 2×2 array or four PC plates (example of one such plate being 130B) are affixed to 110B. Substrate 110B can be coated (120B) prior to pick and placing the PCs and the composite process performed on each/all the PC plates. While the specification for any one PC plate can be the same (typically 30×30 mm×1.1 mm thick), variance on their polishing and processing typically results in plates that are all over their tolerancing limits. The limits were chosen to afford higher yield (>75% prior to coating). The pick and place process coupled with the compositing process is illustrated with respect to FIG. 1B(ii) and results in the side view of the 2×2 example depicted in 140B. Instances of PC thickness variation are shown in exaggerated side view. A benefit of the compositing process and structure is that the supporting substrate can be used as a backing plate and allow the ensemble of PCs placed onto it to be treated as one part during a polishing process (150B) in which heights variations across the collection of PCs in the array are removed and the entire collection takes on a coplanar surface (depicted in 155B) forming an array of coplanar composited PCs (160B). The generation of a LV starts with 160B (depicted as 170B) and combined with a LEO assembly (180B, composed of edge epoxy, spacers, and typically includes liquid crystal) and attached to a second supporting substrate (200B) which includes a TCO and AR layer (190B) through a build process, 210B that turns this into a large area composited LV (220B).

The benefit of this method is that a light valve can now become arbitrarily large and is not dependent the PCs growth capability but only on the capability of making high yield PC plates. All the benefits mentioned above with a single composited LV can be used in the arrayed version.

Figure 1C:
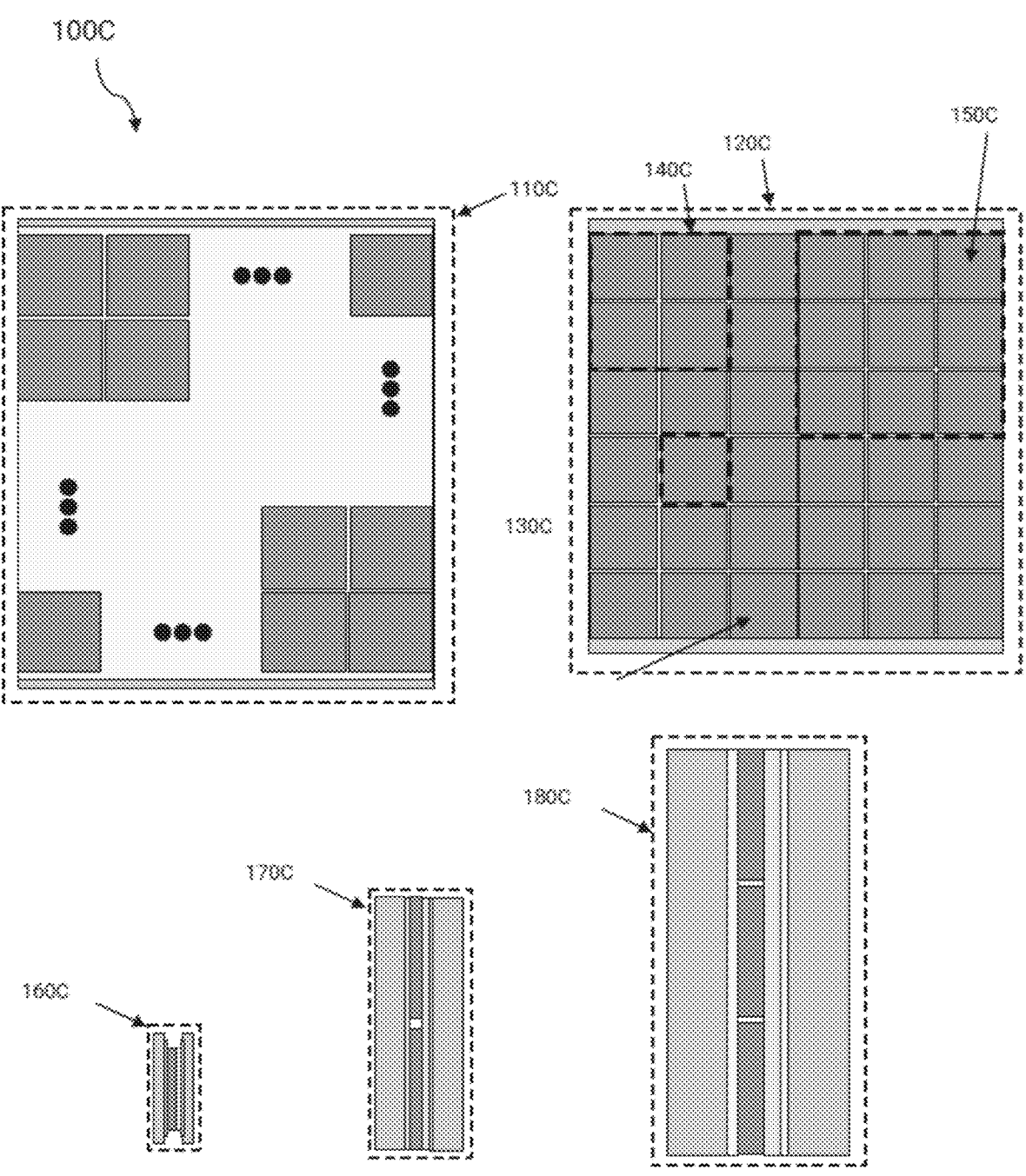

FIG. 1C illustrates singulation for parallel LV manufacturing 100C. An arrayed PC composition 110C allows for large area pick and place of many PCs onto a supporting substrate to allow dicing the array up after all the PCs have been composited to the supporting substrate. An example of this is depicted in 120C which shows a large array of composited PCs on a large supporting substrate with three potential areas of interest to be diced and singulated from this large carrier, a single composted PC (120C), a 2×2 array (140C) and a 3×3 array (150C). These arrays are diced out of 110C and are separately assembled into different sized LVs with 160C, 170C, and 180C associated with 130C, 140C, and 150C, respectively. The benefit of this approach is to allow parallel manufacturing capabilities to reduce the overall cost of making composited PCs and thus LV. Array polishing as discussed with respect to FIG. 1B(ii) can be performed on the entire array prior to dicing to provide planar similarity across the entire array and variance reduction from panel to panel and on its singulation results.

Figure 1D:
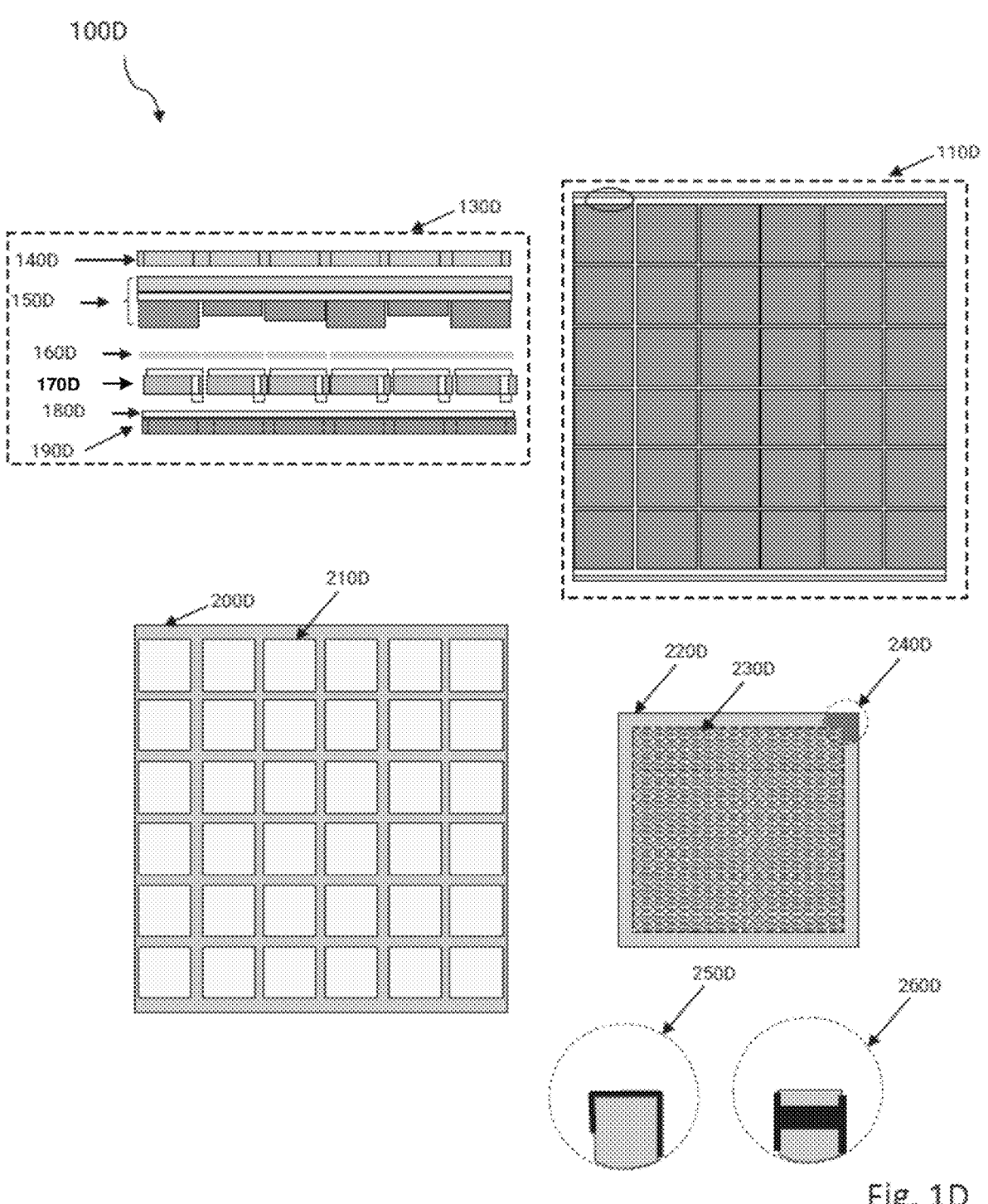

FIG. 1D illustrates manufacture of arrayed LVs 100D independent of PC thickness. PC plates are picked and placed onto a large area support substrate to form an array of composited PCs (110D). The electrical connection to the TCO layer is shown as an extension of the TCO into an area clear of composited PC depicted as 120D. A side view of the resulting LV stack-up (130D) shows that this embodiment contains a non-conductive ceramic protective screen (140D is side view and 200D is plan view), the array of non-planar composite PCs, individual deposited LEO assemblies (160D) on each individual PC interior surface, a AR/TCO layer (170D) on each of the discrete array of secondary support substrates, a compliant electrical conductive connection attachment layer (180D) attached to secondary ceramic protective screen (190D, with 200 being the plan view of it). Since each PC plate contains a separate LEO and support substrate, the epoxy defining the spacing and electrical conduction pathways need to be protected from the high fluence lasers (HFL), thus the need for the protective screens (140D and 190D) sandwiching the LV assembly. The second substrate which includes a TCO on the inner side (next to 160D) can have an electrical conduction path that allows for electrical connectivity external to the LEO layer. This can be done by tailoring the TCO layer on the secondary substrate (220D) with one of several possible methods, two of which are depicted. The inner surface (the surface in contact with 160D) is coated with an AR/TCO layer, 230D. At one or more corners of 220D (one is depicted here) is a connection path (240D) from the interior surface to the exterior surface where electrical connection is possible. Edge wrap-deposition (250D) can be used in which a bond line trace extends from a surface to an edge, up the side of the part to an electrical pad placed on the outward side of that part, while the other method is a plated through-hole (260D) in which a hole previously drilled through 220D is plated to allow top side electrical connection.

The benefit of this embodiment is not needing the polishing step noted in FIG. 1B(ii) to planarize the PC surfaces with consequent risk of breaking, cracking or damaging a composited PC part during the polishing process. Additionally, the method allows parallelization of the entire LV assembly using automated manufacturing equipment to drastically reduce manufacturing cost of making large area LVs. The topside electrification contact points are collected and brought out to an edge contact point in the 180D layer and is protected from the HFL by 140D and 190D. Additionally, 180D can be a flex circuit containing a pin grid array or other compliant electrical connections, easing construction complexity while reducing system costs. An advantage of a flexible electrical connection is that singulation of the supporting substrate can be made, after LV array has been assembled, to allow arrayed LVs to be used for applications that require curvature of the arrays set of LVs, an example being for adaptive optics on astronomical telescopes or laser-grade weapon systems, while replacing the primary adaptive optical systems. A secondary advantage would be to allow large area LV arrayed assemblies to replace any optical element/system that requires adaption such as zoom lenses or beam reformatting, since LVs can take phase and/or amplitude response functions.

Figure 1E:
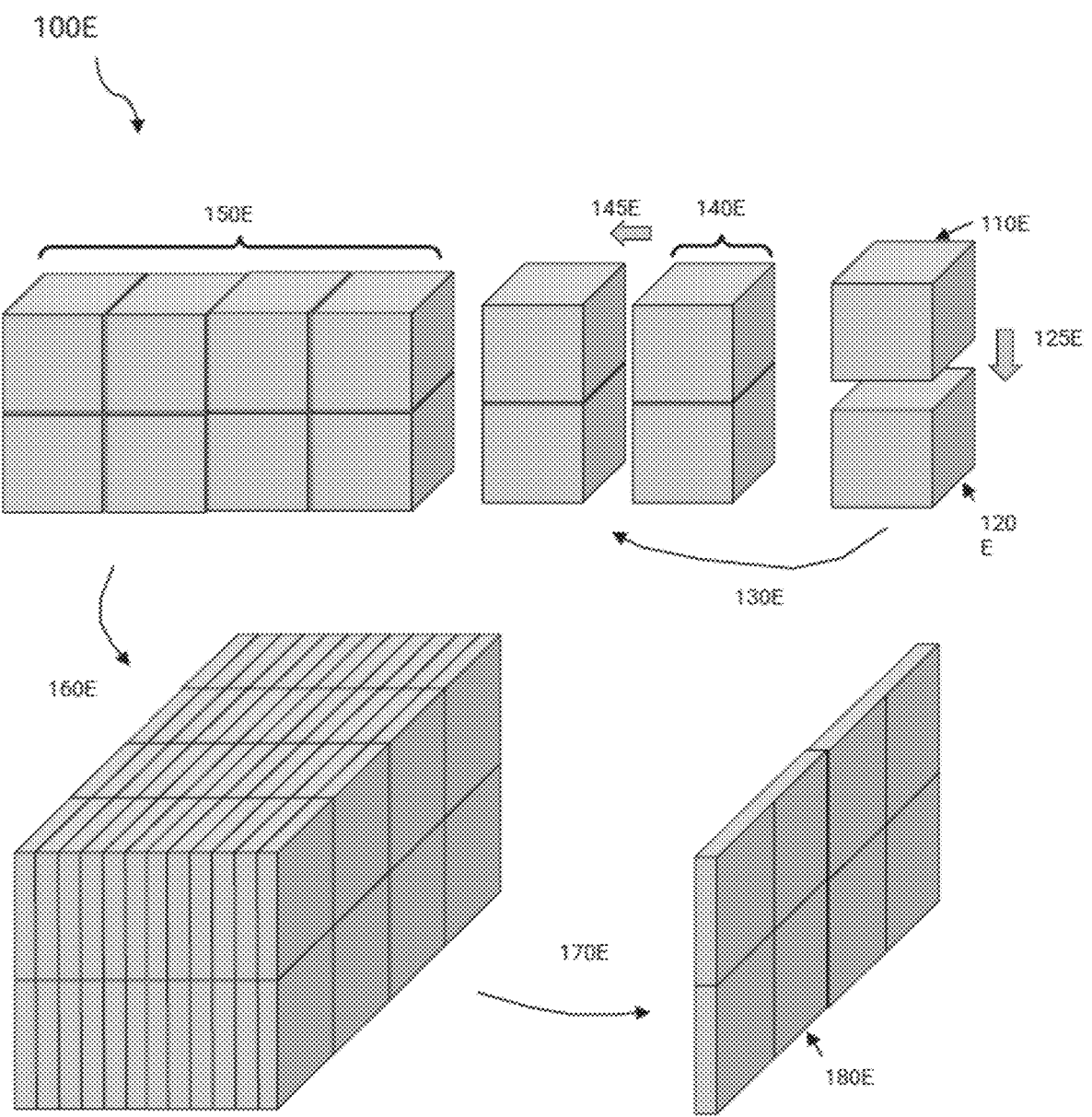

FIG. 1E illustrates arraying of photoconductor blocks to allow for generation of large area photoconductors plates. High yield PC blocks 110E and 120E harvested and shaped from the PC boule and composited to each other through process (depicted by 125E and 130E to form a 1×2 PC block 140E. This process is repeated 145C and 150E using one or more 1×2 blocks to form N×M array of PC block (a 4×2 array is depicted in 150E. 150E is processed into plates by 160C by a sawing process and singulated via 170E to form a large area PC plate 80E. Advantageously this allows large area PC plates to be created without needing to grow large diameter boules.

A wide range of lasers of various wavelengths can used in combination with the described phase change light valve system. In some embodiments, possible laser types include, but are not limited to: Gas Lasers, Chemical Lasers, Dye Lasers, Metal Vapor Lasers, Solid State Lasers (e.g. fiber), Semiconductor (e.g. diode) Lasers, Free electron laser, Gas dynamic laser, "Nickel-like" Samarium laser, Raman laser, or Nuclear pumped laser.

A Gas Laser can include lasers such as a Helium-neon laser, Argon laser, Krypton laser, Xenon ion laser, Nitrogen laser, Carbon dioxide laser, Carbon monoxide laser or Excimer laser.

A Chemical laser can include lasers such as a Hydrogen fluoride laser, Deuterium fluoride laser, COIL (Chemical oxygen-iodine laser), or Agil (All gas-phase iodine laser).

A Metal Vapor Laser can include lasers such as a Helium-cadmium (HeCd) metal-vapor laser, Helium-mercury (HeHg) metal-vapor laser, Helium-selenium (HeSe) metal-vapor laser, Helium-silver (HeAg) metal-vapor laser, Strontium Vapor Laser, Neon-copper (NeCu) metal-vapor laser, Copper vapor laser, Gold vapor laser, or Manganese (Mn/MnCl2) vapor laser. Rubidium or other alkali metal vapor lasers can also be used. A Solid State Laser can include lasers such as a Ruby laser, Nd:YAG laser, NdCrYAG laser, Er:YAG laser, Neodymium YLF (Nd:YLF) solid-state laser, Neodymium doped Yttrium orthovanadate(Nd:YVO4) laser, Neodymium doped yttrium calcium oxoborateNd:YCa4O (BO3)3 or simply Nd:YCOB, Neodymium glass (Nd:Glass) laser, Titanium sapphire (Ti:sapphire) laser, Thulium YAG (Tm:YAG) laser, Ytterbium YAG (Yb:YAG) laser, Ytterbium:2O3 (glass or ceramics) laser, Ytterbium doped glass laser (rod, plate/chip, and fiber), Holmium YAG (Ho:YAG) laser, Chromium ZnSe (Cr:ZnSe) laser, Cerium doped lithium strontium (or calcium)aluminum fluoride (Ce:LiSAF, Ce:LiCAF), Promethium 147 doped phosphate glass (147Pm+3:Glass) solid-state laser, Chromium doped chrysoberyl (alexandrite) laser, Erbium doped anderbium-ytterbium co-doped glass lasers, Trivalent uranium doped calcium fluoride (U:CaF2) solid-state laser, Divalent samarium doped calcium fluoride (Sm:CaF2) laser, or F-Center laser.

A Semiconductor Laser can include laser medium types such as GaN, InGaN, AlGaInP, AlGaAs, InGaAsP, GaInP, InGaAs, InGaAsO, GaInAsSb, lead salt, Vertical cavity surface emitting laser (VCSEL), Quantum cascade laser, Hybrid silicon laser, or combinations thereof.

Figure 2:
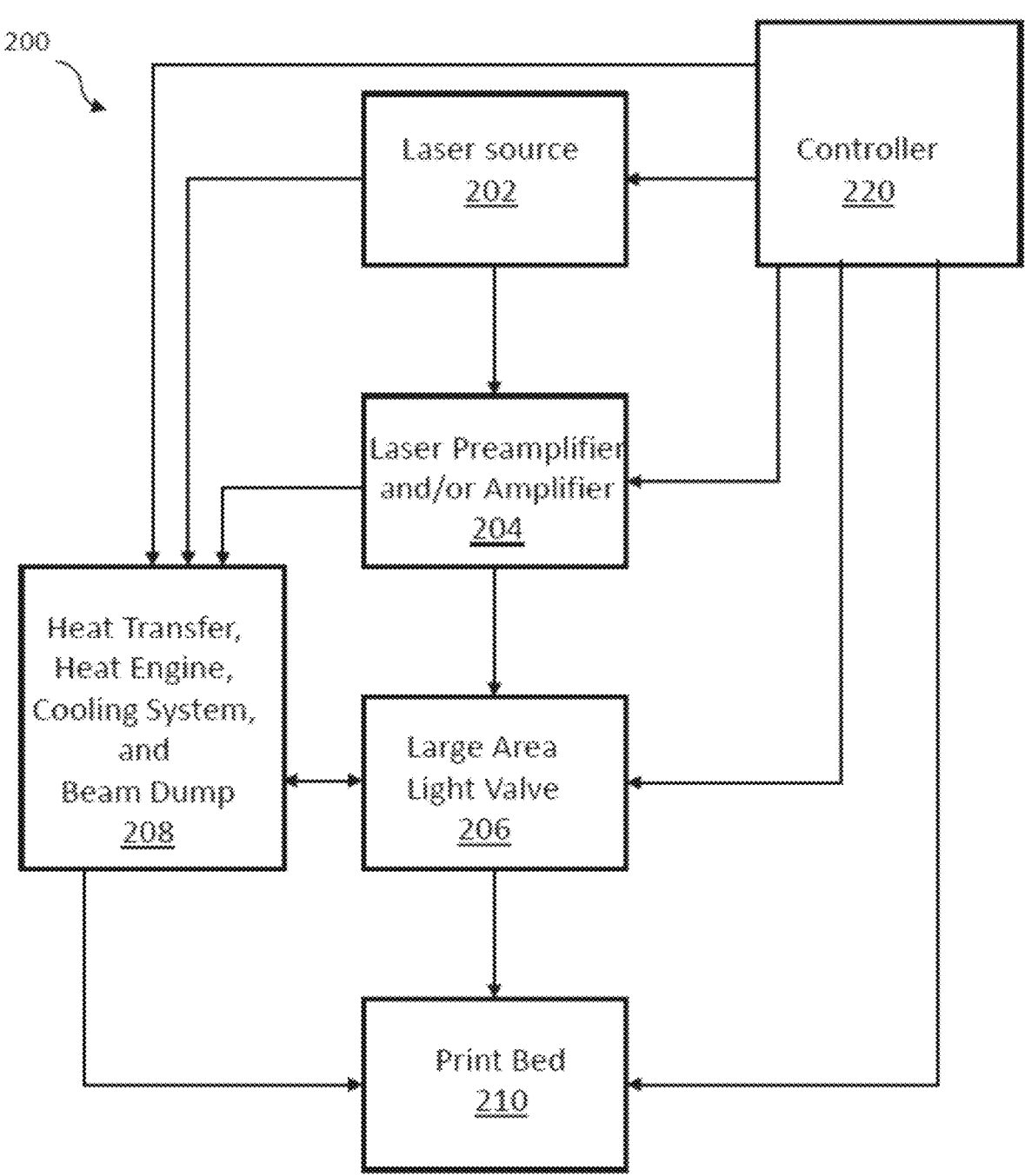
FIG. 2 illustrates a block diagram of a high fluence light valve based additive manufacturing system supporting a beam dump, a large area arrayed light valve, and a heat engine.

FIG. 2 illustrates use of a large area light valves such as disclosed herein in an additive manufacturing system 200. A laser source 202 directs a laser beam through a laser pre-amplifier and/or amplifier 204 into a large area light valve 206. After patterning, light can be directed into a print bed 210. In some embodiments, heat or laser energy from laser source 202, laser preamplifier and/or amplifier 204, or a large area light valve 206 can be actively or passively transferred to a heat transfer, heat engine, cooling system, and beam dump 208. Overall operation of the light valve based additive manufacturing system 200 can controlled by one or more controllers 220 that can modify laser power and timing.

In some embodiments, various preamplifiers or amplifiers 204 are optionally used to provide high gain to the laser signal, while optical modulators and isolators can be distributed throughout the system to reduce or avoid optical damage, improve signal contrast, and prevent damage to lower energy portions of the system 200. Optical modulators and isolators can include, but are not limited to Pockels cells, Faraday rotators, Faraday isolators, acousto-optic reflectors, or volume Bragg gratings. Pre-amplifier or amplifiers 204 could be diode pumped or flash lamp pumped amplifiers and configured in single and/or multi-pass or cavity type architectures. As will be appreciated, the term pre-amplifier here is used to designate amplifiers which are not limited thermally (i.e. they are smaller) versus laser amplifiers (larger). Amplifiers will typically be positioned to be the final units in a laser system 200 and will be the first modules susceptible to thermal damage, including but not limited to thermal fracture or excessive thermal lensing.

Laser pre-amplifiers can include single pass pre-amplifiers usable in systems not overly concerned with energy efficiency. For more energy efficient systems, multi-pass pre-amplifiers can be configured to extract much of the energy from each pre-amplifier 204 before going to the next stage. The number of pre-amplifiers 204 needed for a particular system is defined by system requirements and the stored energy/gain available in each amplifier module. Multi-pass pre-amplification can be accomplished through angular multiplexing or polarization switching (e.g. using waveplates or Faraday rotators).

Alternatively, pre-amplifiers can include cavity structures with a regenerative amplifier type configuration. While such cavity structures can limit the maximum pulse length due to typical mechanical considerations (length of cavity), in some embodiments "white cell" cavities can be used. A "white cell" is a multi-pass cavity architecture in which a small angular deviation is added to each pass. By providing an entrance and exit pathway, such a cavity can be designed to have extremely large number of passes between entrance and exit allowing for large gain and efficient use of the amplifier. One example of a white cell would be a confocal cavity with beams injected slightly off axis and mirrors tilted such that the reflections create a ring pattern on the mirror after many passes. By adjusting the injection and mirror angles the number of passes can be changed.

Amplifiers are also used to provide enough stored energy to meet system energy requirements, while supporting sufficient thermal management to enable operation at system required repetition rate whether they are diode or flashlamp pumped. Both thermal energy and laser energy generated during operation can be directed the heat transfer, heat engine, cooling system, and beam dump 208.

Amplifiers can be configured in single and/or multi-pass or cavity type architectures. Amplifiers can include single pass amplifiers usable in systems not overly concerned with energy efficiency. For more energy efficient systems, multi-pass amplifiers can be configured to extract much of the energy from each amplifier before going to the next stage. The number of amplifiers needed for a particular system is defined by system requirements and the stored energy/gain available in each amplifier module. Multipass pre-amplification can be accomplished through angular multiplexing, polarization switching (waveplates, Faraday rotators). Alternatively, amplifiers can include cavity structures with a regenerative amplifier type configuration. As discussed with respect to pre-amplifiers, amplifiers can be used for power amplification.

In some embodiments, thermal energy and laser energy generated during operation of system 200 can be directed into the heat transfer, heat engine, cooling system, and beam dump 208. Alternatively, or in addition, in some embodiments the beam dump 208 can be a part of a heat transfer system to provide useful heat to other industrial processes. In still other embodiments, the heat can be used to power a heat engine suitable for generating mechanical, thermoelectric, or electric power. In some embodiments, waste heat can be used to increase temperature of connected components. As will be appreciated, laser flux and energy can be scaled in this architecture by adding more pre-amplifiers and amplifiers with appropriate thermal management and optical isolation. Adjustments to heat removal characteristics of the cooling system are possible, with increase in pump rate or changing cooling efficiency being used to adjust performance.

Figure 3:
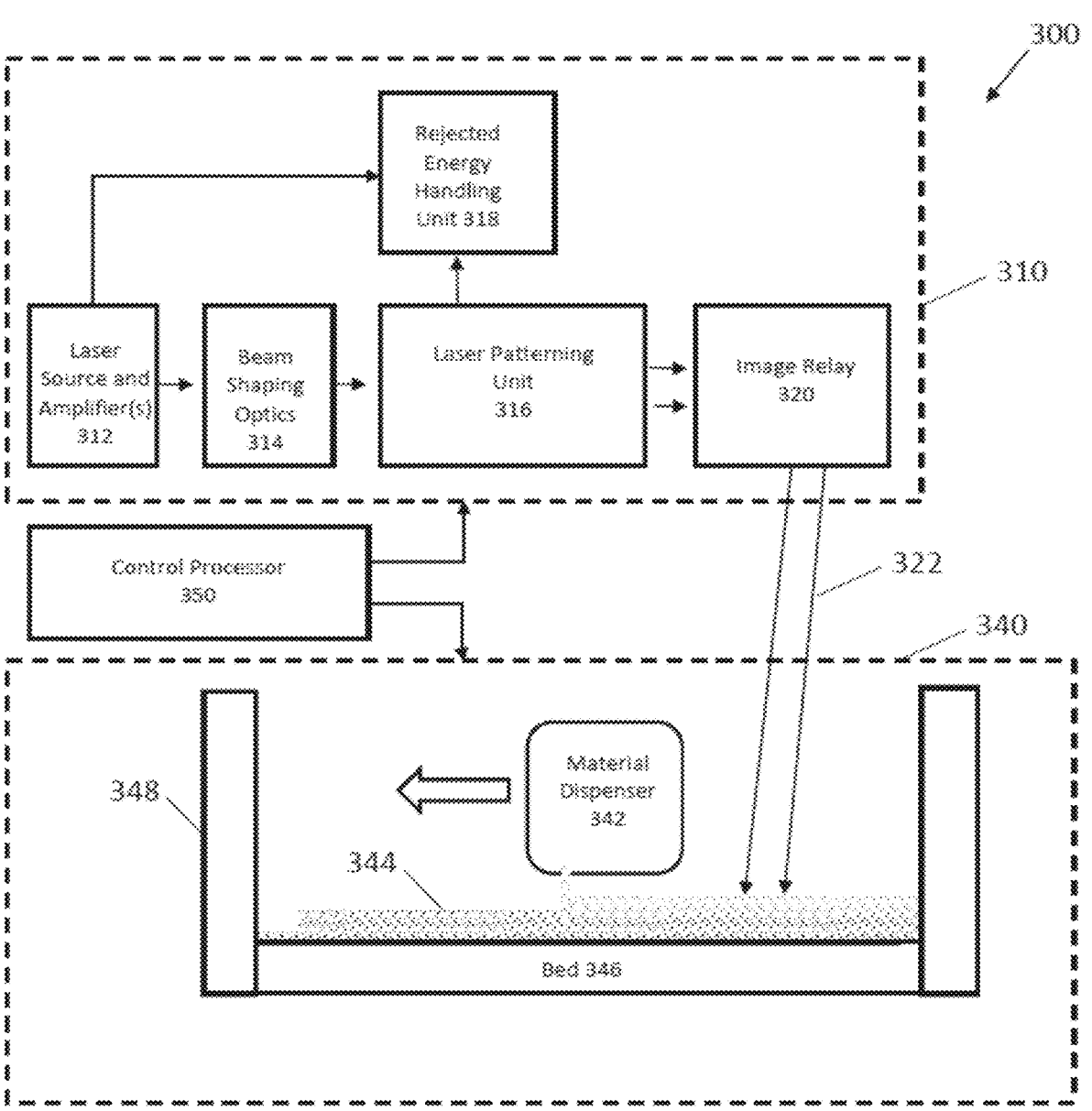
FIG. 3 illustrates a high fluence large area arrayed light valve based additive manufacturing system.

FIG. 3 illustrates an additive manufacturing system 300 that can accommodate large area light valves as described in this disclosure. As seen in FIG. 3, a laser source and amplifier(s) 312 can include large area light valves and laser amplifiers and other components such as previously described. As illustrated in FIG. 3, the additive manufacturing system 300 uses lasers able to provide one or two dimensional directed energy as part of a laser patterning system 310. In some embodiments, one dimensional patterning can be directed as linear or curved strips, as rastered lines, as spiral lines, or in any other suitable form. Two-dimensional patterning can include separated or overlapping tiles, or images with variations in laser intensity. Two-dimensional image patterns having non-square boundaries can be used, overlapping or interpenetrating images can be used, and images can be provided by two or more energy patterning systems. The laser patterning system 310 uses laser source and amplifier(s) 312 to direct one or more continuous or intermittent energy beam(s) toward beam shaping optics 314. After shaping, if necessary, the beam is patterned by a laser patterning unit 316 that includes either a transmissive or reflective light valve, with generally some energy being directed to a rejected energy handling unit 318. The rejected energy handling unit can utilize heat provided by active of cooling of light.

Patterned energy is relayed by image relay 320 toward an article processing unit 340, in one embodiment as a two-dimensional image 322 focused near a bed 346. The bed 346 (with optional walls 348) can form a chamber containing material 344 (e.g. a metal powder) dispensed by material dispenser 342. Patterned energy, directed by the image relay 320, can melt, fuse, sinter, amalgamate, change crystal structure, influence stress patterns, or otherwise chemically or physically modify the dispensed material 344 to form structures with desired properties. A control processor 350 can be connected to variety of sensors, actuators, heating or cooling systems, monitors, and controllers to coordinate operation of the laser source and amplifier(s) 312, beam shaping optics 314, laser patterning unit 316, and image relay 320, as well as any other component of system 300. As will be appreciated, connections can be wired or wireless, continuous or intermittent, and include capability for feedback (for example, thermal heating can be adjusted in response to sensed temperature).

In some embodiments, beam shaping optics 314 can include a great variety of imaging optics to combine, focus, diverge, reflect, refract, homogenize, adjust intensity, adjust frequency, or otherwise shape and direct one or more laser beams received from the laser source and amplifier(s) 312 toward the laser patterning unit 316. In one embodiment, multiple light beams, each having a distinct light wavelength, can be combined using wavelength selective mirrors (e.g. dichroics) or diffractive elements. In other embodiments, multiple beams can be homogenized or combined using multifaceted mirrors, microlenses, and refractive or diffractive optical elements.

Laser patterning unit 316 can include static or dynamic energy patterning elements. For example, laser beams can be blocked by masks with fixed or movable elements. To increase flexibility and ease of image patterning, pixel addressable masking, image generation, or transmission can be used. In some embodiments, the laser patterning unit includes addressable light valves, alone or in conjunction with other patterning mechanisms to provide patterning. The light valves can be transmissive, reflective, or use a combination of transmissive and reflective elements. Patterns can be dynamically modified using electrical or optical addressing. In one embodiment, a transmissive optically addressed light valve acts to rotate polarization of light passing through the valve, with optically addressed pixels forming patterns defined by a light projection source. In another embodiment, a reflective optically addressed light valve includes a write beam for modifying polarization of a read beam. In certain embodiments, non-optically addressed light valves can be used. These can include but are not limited to electrically addressable pixel elements, movable mirror or micro-mirror systems, piezo or micro-actuated optical systems, fixed or movable masks, or shields, or any other conventional system able to provide high intensity light patterning.

Rejected energy handling unit 318 is used to disperse, redirect, or utilize energy not patterned and passed through the image relay 320. In one embodiment, the rejected energy handling unit 318 can include passive or active cooling elements that remove heat from both the laser source, light valve(s), and amplifier(s) 312 and the laser patterning unit 316. In other embodiments, the rejected energy handling unit can include a "beam dump" to absorb and convert to heat any beam energy not used in defining the laser pattern.

In still other embodiments, rejected laser beam energy can be recycled using beam shaping optics 314. Alternatively, or in addition, rejected beam energy can be directed to the article processing unit 340 for heating or further patterning. In certain embodiments, rejected beam energy can be directed to additional energy patterning systems or article processing units.

In one embodiment, a "switchyard" style optical system can be used. Switchyard systems are suitable for reducing the light wasted in the additive manufacturing system as caused by rejection of unwanted light due to the pattern to be printed. A switchyard involves redirections of a complex pattern from its generation (in this case, a plane whereupon a spatial pattern is imparted to structured or unstructured beam) to its delivery through a series of switch points. Each switch point can optionally modify the spatial profile of the incident beam. The switchyard optical system may be utilized in, for example and not limited to, laser-based additive manufacturing techniques where a mask is applied to the light. Advantageously, in various embodiments in accordance with the present disclosure, the thrown-away energy may be recycled in either a homogenized form or as a patterned light that is used to maintain high power efficiency or high throughput rates. Moreover, the thrown-away energy can be recycled and reused to increase intensity to print more difficult materials.

Image relay 320 can receive a patterned image (either one or two-dimensional) from the laser patterning unit 316 directly or through a switchyard and guide it toward the article processing unit 340. In a manner similar to beam shaping optics 314, the image relay 320 can include optics to combine, focus, diverge, reflect, refract, adjust intensity, adjust frequency, or otherwise shape and direct the patterned light. Patterned light can be directed using movable mirrors, prisms, diffractive optical elements, or solid state optical systems that do not require substantial physical movement. One of a plurality of lens assemblies can be configured to provide the incident light having the magnification ratio, with the lens assemblies both a first set of optical lenses and a second sets of optical lenses, and with the second sets of optical lenses being swappable from the lens assemblies. Rotations of one or more sets of mirrors mounted on compensating gantries and a final mirror mounted on a build platform gantry can be used to direct the incident light from a precursor mirror onto a desired location. Translational movements of compensating gantries and the build platform gantry are also able to ensure that distance of the incident light from the precursor mirror the article processing unit 340 is substantially equivalent to the image distance. In effect, this enables a quick change in the optical beam delivery size and intensity across locations of a build area for different materials while ensuring high availability of the system.

Article processing unit 340 can include a walled chamber 348 and bed 344 (collectively defining a build chamber), and a material dispenser 342 for distributing material. The material dispenser 342 can distribute, remove, mix, provide gradations or changes in material type or particle size, or adjust layer thickness of material. The material can include metal, ceramic, glass, polymeric powders, other melt-able material capable of undergoing a thermally induced phase change from solid to liquid and back again, or combinations thereof. The material can further include composites of melt-able material and non-melt-able material where either or both components can be selectively targeted by the imaging relay system to melt the component that is melt-able, while either leaving along the non-melt-able material or causing it to undergo a vaporizing/destroying/combusting or otherwise destructive process. In certain embodiments, slurries, sprays, coatings, wires, strips, or sheets of materials can be used. Unwanted material can be removed for disposable or recycling by use of blowers, vacuum systems, sweeping, vibrating, shaking, tipping, or inversion of the bed 346.

In addition to material handling components, the article processing unit 340 can include components for holding and supporting 3D structures, mechanisms for heating or cooling the chamber, auxiliary or supporting optics, and sensors and control mechanisms for monitoring or adjusting material or environmental conditions. The article processing unit can, in whole or in part, support a vacuum or inert gas atmosphere to reduce unwanted chemical interactions as well as to mitigate the risks of fire or explosion (especially with reactive metals). In some embodiments, various pure or mixtures of other atmospheres can be used, including those containing Ar, He, Ne, Kr, Xe, $CO_2$, $N_2$, $O_2$, $SF_6$, $CH_4$, CO, $N_2O$, $C_2H_2$, $C_2H_4$, $C_2H_6$, $C_3H_6$, $C_3H_8$, i-$C_4H_{10}$, $C_4H_{10}$, 1-$C_4H_8$, cic-2,$C_4H_7$, 1,3-$C_4H_6$, 1,2-C4H6, $C_5H_{12}$, n-$C_5H_{12}$, i-$C_5H_{12}$, n-C6$H_{14}$, $C_2H_3Cl$, $C_7H_{16}$, $C_8H_{18}$, $C_{10}H_{22}$, $C_{11}H_{24}$, $C_{12}H_{26}$, $C_{13}H_{28}$, $C_{14}H_{30}$, $C_{15}H_{32}$, $C_{16}H_{34}$, $C_6H_6$, $C_6H_5$—$CH_3$, $C_8H_{10}$, $C_2H_5OH$, $CH_3OH$, i$C_4H_8$. In some embodiments, refrigerants or large inert molecules (including but not limited to sulfur hexafluoride) can be used. An enclosure atmospheric composition to have at least about 1% He by volume (or number density), along with selected percentages of inert/non-reactive gasses can be used.

In certain embodiments, a plurality of article processing units or build chambers, each having a build platform to hold a powder bed, can be used in conjunction with multiple optical-mechanical assemblies arranged to receive and direct the one or more incident energy beams into the build chambers. Multiple chambers allow for concurrent printing of one or more print jobs inside one or more build chambers. In other embodiments, a removable chamber sidewall can simplify removal of printed objects from build chambers, allowing quick exchanges of powdered materials. The chamber can also be equipped with an adjustable process temperature controls. In still other embodiments, a build chamber can be configured as a removable printer cartridge positionable near laser optics. In some embodiments a removable printer cartridge can include powder or support detachable connections to a powder supply. After manufacture of an item, a removable printer cartridge can be removed and replaced with a fresh printer cartridge.

In another embodiment, one or more article processing units or build chambers can have a build chamber that is maintained at a fixed height, while optics are vertically movable. A distance between final optics of a lens assembly and a top surface of powder bed a may be managed to be essentially constant by indexing final optics upwards, by a distance equivalent to a thickness of a powder layer, while keeping the build platform at a fixed height. Advantageously, as compared to a vertically moving the build platform, large and heavy objects can be more easily manufactured, since precise micron scale movements of the ever changing mass of the build platform are not needed. Typically, build chambers intended for metal powders with a volume more than ~0.1-0.2 cubic meters (i.e., greater than 100-200 liters or heavier than 500-1,000 kg) will most benefit from keeping the build platform at a fixed height.

In one embodiment, a portion of the layer of the powder bed may be selectively melted or fused to form one or more temporary walls out of the fused portion of the layer of the powder bed to contain another portion of the layer of the powder bed on the build platform. In selected embodiments, a fluid passageway can be formed in the one or more first walls to enable improved thermal management.

In some embodiments, the additive manufacturing system can include article processing units or build chambers with a build platform that supports a powder bed capable of tilting, inverting, and shaking to separate the powder bed substantially from the build platform in a hopper. The powdered material forming the powder bed may be collected in a hopper for reuse in later print jobs. The powder collecting process may be automated and vacuuming or gas jet systems also used to aid powder dislodgement and removal.

Some embodiments, the additive manufacturing system can be configured to easily handle parts longer than an available build chamber. A continuous (long) part can be sequentially advanced in a longitudinal direction from a first zone to a second zone. In the first zone, selected granules of a granular material can be amalgamated. In the second zone, unamalgamated granules of the granular material can be removed. The first portion of the continuous part can be advanced from the second zone to a third zone, while a last portion of the continuous part is formed within the first zone and the first portion is maintained in the same position in the lateral and transverse directions that the first portion occupied within the first zone and the second zone. In effect, additive manufacture and clean-up (e.g., separation and/or reclamation of unused or unamalgamated granular material) may be performed in parallel (i.e., at the same time) at different locations or zones on a part conveyor, with no need to stop for removal of granular material and/or parts.

In another embodiment, additive manufacturing capability can be improved by use of an enclosure restricting an exchange of gaseous matter between an interior of the enclosure and an exterior of the enclosure. An airlock provides an interface between the interior and the exterior; with the interior having multiple additive manufacturing chambers, including those supporting power bed fusion. A gas management system maintains gaseous oxygen within the interior at or below a limiting oxygen concentration, increasing flexibility in types of powder and processing that can be used in the system.

In another manufacturing embodiment, capability can be improved by having an article processing units or build chamber contained within an enclosure, the build chamber being able to create a part having a weight greater than or equal to 2,000 kilograms. A gas management system may maintain gaseous oxygen within the enclosure at concentrations below the atmospheric level. In some embodiments, a wheeled vehicle may transport the part from inside the enclosure, through an airlock, since the airlock operates to buffer between a gaseous environment within the enclosure and a gaseous environment outside the enclosure, and to a location exterior to both the enclosure and the airlock.

Other manufacturing embodiments involve collecting powder samples in real-time from the powder bed. An ingester system is used for in-process collection and characterizations of powder samples. The collection may be performed periodically and the results of characterizations result in adjustments to the powder bed fusion process. The ingester system can optionally be used for one or more of audit, process adjustments or actions such as modifying printer parameters or verifying proper use of licensed powder materials.

Yet another improvement to an additive manufacturing process can be provided by use of a manipulator device such as a crane, lifting gantry, robot arm, or similar that allows for the manipulation of parts that would be difficult or impossible for a human to move is described. The manipulator device can grasp various permanent or temporary additively manufactured manipulation points on a part to enable repositioning or maneuvering of the part.

Control processor 350 can be connected to control any components of additive manufacturing system 300 described herein, including lasers, laser amplifiers, optics, heat control, build chambers, and manipulator devices. The control processor 350 can be connected to variety of sensors, actuators, heating or cooling systems, monitors, and controllers to coordinate operation. A wide range of sensors, including imagers, light intensity monitors, thermal, pressure, or gas sensors can be used to provide information used in control or monitoring. The control processor can be a single central controller, or alternatively, can include one or more independent control systems. The controller processor 350 is provided with an interface to allow input of manufacturing instructions. Use of a wide range of sensors allows various feedback control mechanisms that improve quality, manufacturing throughput, and energy efficiency.

Figure 4:
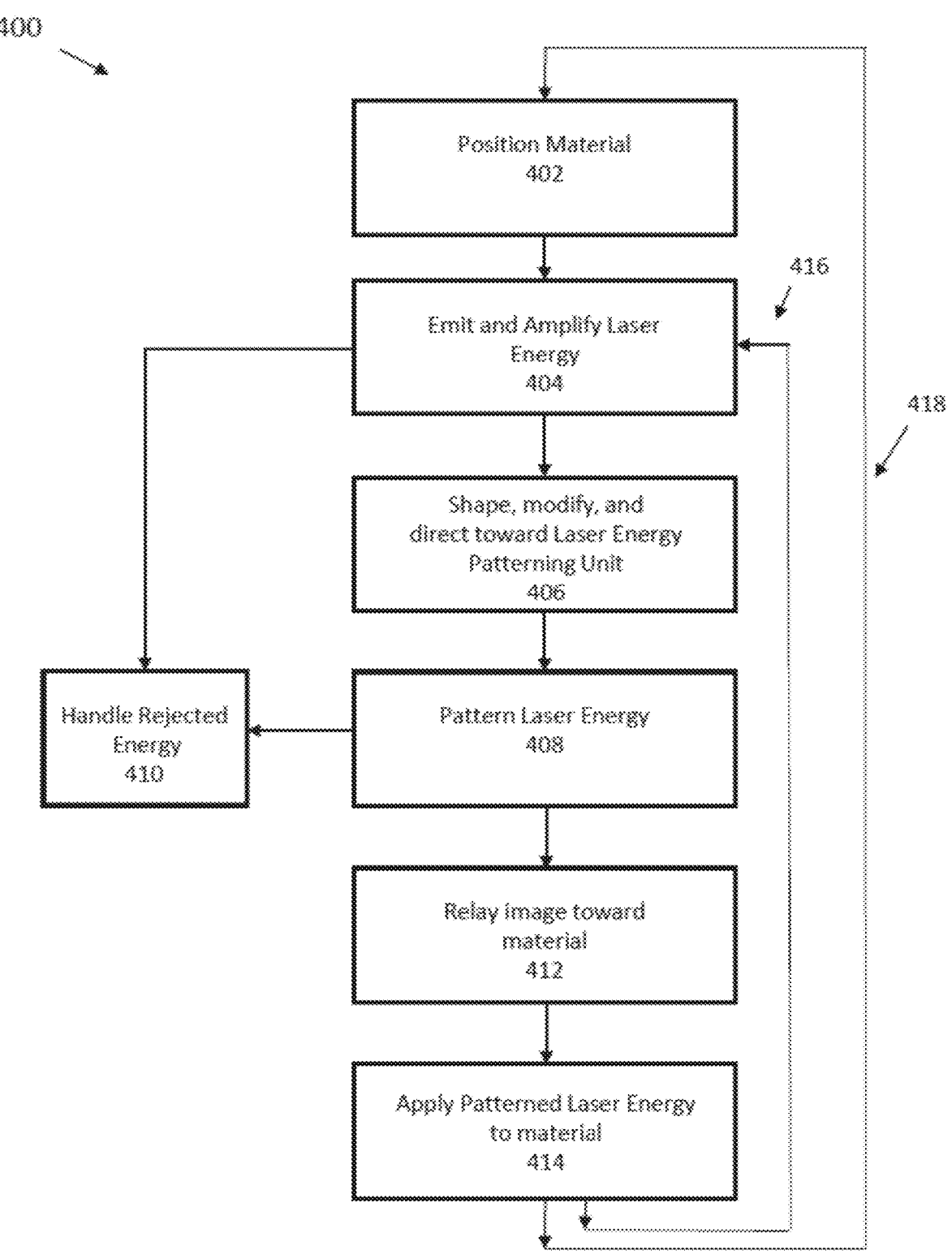
FIG. 4 illustrates another embodiment of a high fluence large area arrayed light valve based additive manufacturing system.

One embodiment of operation of a manufacturing system supporting use of a large area light valve suitable for additive or subtractive manufacture is illustrated in FIG. 4. In this embodiment, a flow chart 400 illustrates one embodiment of a manufacturing process supported by the described optical and mechanical components. In step 402, material is positioned in a bed, chamber, or other suitable support. The material can be a metal plate for laser cutting using subtractive manufacture techniques, or a powder capable of being melted, fused, sintered, induced to change crystal structure, have stress patterns influenced, or otherwise chemically or physically modified by additive manufacturing techniques to form structures with desired properties.

In step 404, unpatterned laser energy is emitted by one or more energy emitters, including but not limited to solid state or semiconductor lasers, and then amplified by one or more laser amplifiers. In step 406, the unpatterned laser energy is shaped and modified (e.g. intensity modulated or focused). In step 408, this unpatterned laser energy is patterned by a large area light valve, with energy not forming a part of the pattern being handled in step 410 (this can include use of a beam dump as disclosed with respect to FIG. 2 and FIG. 3 that provide conversion to waste heat, recycling as patterned or unpatterned energy, or waste heat generated by cooling the laser amplifiers in step 404). In step 412, the patterned energy, now forming a one or two-dimensional image is relayed toward the material. In step 414, the image is applied to the material, either subtractively processing or additively building a portion of a 3D structure. For additive manufacturing, these steps can be repeated (loop 416) until the image (or different and subsequent image) has been applied to all necessary regions of a top layer of the material. When application of energy to the top layer of the material is finished, a new layer can be applied (loop 418) to continue building the 3D structure. These process loops are continued until the 3D structure is complete, when remaining excess material can be removed or recycled.

Figure 5:
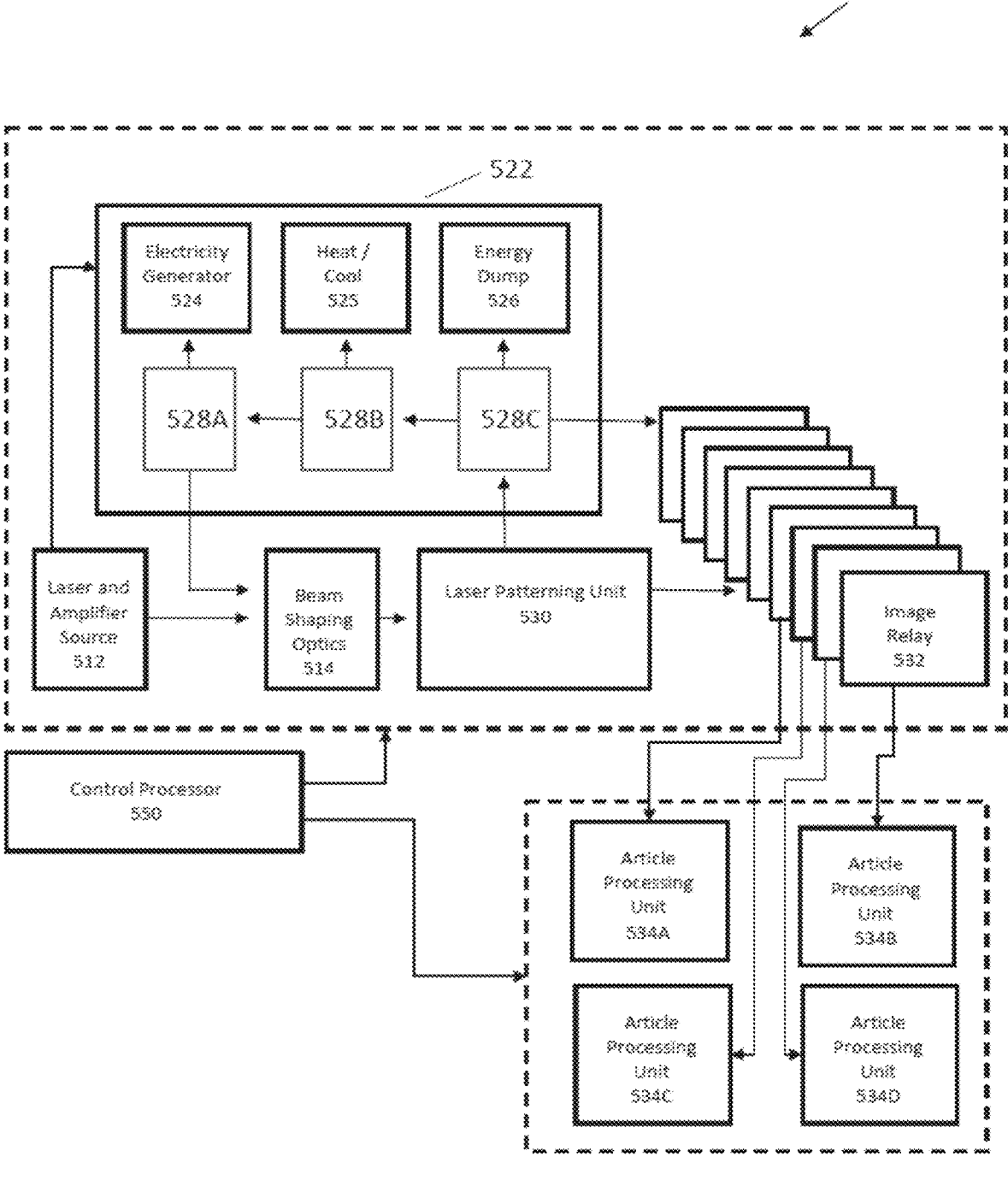
FIG. 5 illustrates another embodiment of a high fluence large area arrayed light valve based additive manufacturing which incorporates a switchyard approach for recovery and further usage of waste energy.

FIG. 5 is one embodiment of an additive manufacturing system that includes a large area light valve and a switchyard system enabling reuse of patterned two-dimensional energy. An additive manufacturing system 520 has an energy patterning system with a laser and amplifier source 512 that directs one or more continuous or intermittent laser beam(s) toward beam shaping optics 514. Excess heat can be transferred into a rejected energy handling unit 522 that can include an active light valve cooling system as disclosed with respect FIG. 2, FIG. 3, and FIG. 4. After shaping, the beam is two-dimensionally patterned by an energy patterning unit 530, with generally some energy being directed to the rejected energy handling unit 522. Patterned energy is relayed by one of multiple image relays 532 toward one or more article processing units 534A, 534B, 534C, or 534D, typically as a two-dimensional image focused near a movable or fixed height bed. The bed can be inside a cartridge that includes a powder hopper or similar material dispenser. Patterned laser beams, directed by the image relays 532, can melt, fuse, sinter, amalgamate, change crystal structure, influence stress patterns, or otherwise chemically or physically modify the dispensed material to form structures with desired properties.

In this embodiment, the rejected energy handling unit has multiple components to permit reuse of rejected patterned energy. Coolant fluid from the laser amplifier and source 512 can be directed into one or more of an electricity generator 524, a heat/cool thermal management system 525, or an energy dump 526. Additionally, relays 528A, 528B, and 528C can respectively transfer energy to the electricity generator 524, the heat/cool thermal management system 525, or the energy dump 526. Optionally, relay 528C can direct patterned energy into the image relay 532 for further processing. In other embodiments, patterned energy can be directed by relay 528C, to relay 528B and 528A for insertion into the laser beam(s) provided by laser and amplifier source 512. Reuse of patterned images is also possible using image relay 532. Images can be redirected, inverted, mirrored, sub-patterned, or otherwise transformed for distribution to one or more article processing units. 534A-D. Advantageously, reuse of the patterned light can improve energy efficiency of the additive manufacturing process, and in some cases improve energy intensity directed at a bed or reduce manufacture time.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims. It is also understood that other embodiments of this invention may be practiced in the absence of an element/step not specifically disclosed herein.

The invention claimed is:

1. A light valve for patterning incoming laser beam, comprising:
  a substrate; and
  at least two photoconductor plates attached to the substrate, wherein the at least two photoconductor plates attached to the substrate are laterally positioned with respect to each other and are polished as one part to have uniform thickness across the at least two photoconductors.

2. The light valve of claim 1, wherein the substrate comprises sapphire.

3. The light valve of claim 1, wherein the at least two photoconductor plates attached to the substrate are in an N×M array of photoconductor plates.

4. The light valve of claim 1, wherein the at least two photoconductor plates are attached to the substrate with a glass glue.

5. The light valve of claim 1, wherein the at least two photoconductor plates are thermal expansion matched to the substrate.

6. The light valve of claim 1, wherein the at least two photoconductor plates are each attached to secondary substrates that are each attached to the substrate.

7. The light valve of claim 1, wherein the at least two photoconductor plates comprise at least one of Bismuth Silicates, Bismuth Germanates, Cadmium Selenides, chalcogenide glasses, polycrystalline materials, amorphous silicon, BSO, $Bi_{12}SiO_{20}$, $Bi_6SiO_{10}$, $Bi_3SiO_5$, Bismuth Germanates, BGO, $Bi_{12}GeO_{20}$, $Bi_6GeO_{10}$, $Bi_3GeO_5$, CdSe, $Ge_2Sb_2Te_5$ (GST), $Sc_{0.2}Sb_2Te_3$, GeTe, $Ag_4In_3Sb_{67}Te_{26}$, $Ge_{15}Sb_{85}$, Sb, CdTe, AZO, ZnSe, ZnS, and Si.

8. The light valve of claim 1, wherein the at least two photoconductor plates each has a linear electro (LEO) layer.

9. An additive manufacturing system, comprising
  a laser light source to form a laser beam;
  a light valve supporting two-dimensional patterning of the light beam, the light valve comprising a substrate and at least two photoconductor plates that are attached to the substrate, wherein the at least two photoconductor plates attached to the substrate are laterally positioned with respect to each other and are polished as one part to have uniform thickness across the at least two photoconductor plates.

10. The additive manufacturing system of claim 9, wherein the substrate comprises sapphire.

11. The additive manufacturing system of claim 9, wherein the at least two photoconductor plates attached to the substrate are in an N×M array of photoconductor plates.

12. The additive manufacturing system of claim 9, wherein the at least two photoconductor plates are attached to the substrate with a glass glue.

13. The additive manufacturing system of claim 9, wherein the at least two photoconductor plates are thermal expansion matched to the substrate.

14. The additive manufacturing system of claim 9, wherein the at least two photoconductor plates are each attached to secondary substrates that are each attached to the substrate.

15. The additive manufacturing system of claim 9, wherein the at least two photoconductor plates comprise at least one of Bismuth Silicates, Bismuth Germanates, Cadmium Selenides, chalcogenide glasses, polycrystalline materials, amorphous silicon, BSO, $Bi_{12}SiO_{20}$, $Bi_6SiO_{10}$, $Bi_3SiO_5$, Bismuth Germanates, BGO, $Bi_{12}GeO_{20}$, $Bi_6GeO_{10}$, $Bi_3GeO_5$, CdSe, $Ge_2Sb_2Te_5$ (GST), $Sc_{0.2}Sb_2Te_3$, GeTe, $Ag_4In_3Sb_{67}Te_{26}$, $Ge_{15}Sb_{85}$, Sb, CdTe, AZO, ZnSe, ZnS, and Si.

16. The additive manufacturing system of claim 9, wherein the at least two photoconductor plates each has a linear electro (LEO) layer.

17. The additive manufacturing system of claim 9, wherein the substrate is coated with a transparent conductive oxide (TCO) layer.

18. The light valve of claim 1, wherein the substrate is coated with a transparent conductive oxide (TCO) layer.

* * * * *